United States Patent
Wivagg et al.

(10) Patent No.: US 6,320,923 B2
(45) Date of Patent: Nov. 20, 2001

(54) BWR JET PUMP WEDGE KEEPER

(75) Inventors: Adrian P. Wivagg, Tolland, CT (US); Dwight E. Starnes, Lafayette, GA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/726,419

(22) Filed: Dec. 1, 2000

Related U.S. Application Data

(62) Division of application No. 09/172,620, filed on Oct. 15, 1998, now abandoned.
(60) Provisional application No. 60/063,657, filed on Oct. 28, 1997.

(51) Int. Cl.$^7$ .................................................. G21C 13/04
(52) U.S. Cl. .......................... 376/407; 379/285; 379/372; 379/392; 379/260
(58) Field of Search ..................... 376/260, 372, 376/470, 285, 392

(56) References Cited

U.S. PATENT DOCUMENTS

| | | | |
|---|---|---|---|
| 4,197,652 | * 4/1980 | Quirnell et al. ........................ | 33/174 |
| 4,572,548 | * 2/1986 | Porowski et al. ....................... | 285/15 |
| 4,702,637 | * 10/1987 | Muellenberg ......................... | 403/373 |
| 4,714,229 | * 12/1987 | Force et al. ........................... | 248/610 |
| 4,743,054 | * 5/1988 | Lavalerie ......................... | 292/256.67 |
| 5,374,136 | * 12/1994 | LaPlante .............................. | 403/370 |
| 5,515,407 | * 5/1996 | Bevilacqua et al. .................. | 376/372 |
| 5,583,899 | * 12/1996 | Relf ..................................... | 376/287 |
| 5,839,192 | * 11/1998 | Weems et al. .................. | 29/890.031 |
| 5,964,029 | * 10/1999 | Weems et al. .......................... | 29/723 |
| 5,978,433 | * 11/1999 | Erbes et al. .......................... | 376/372 |
| 6,052,425 | * 4/2000 | Erbes et al. .......................... | 376/260 |
| 6,099,199 | * 8/2000 | Mullenberg .......................... | 403/370 |

* cited by examiner

Primary Examiner—Michael J. Carone
Assistant Examiner—John Richardson

(57) ABSTRACT

A locking device for use in restraining a jet pump downcomer of a nuclear reactor, including an upper jaw; a lower jaw placed in an opposing position below the upper jaw; and a tightening screw movably supporting the upper jaw and the lower jaw. When installed on a jet pump downcomer, the complete assembly includes a restraining ring; a downcomer carried by the restraining ring; a wedge supported by the restraining ring and the downcomer; and a guide bolt extending in an axial direction in relation to the downcomer such that the wedge is movably supported by the guide bolt. The wedge is interposed between the upper jaw and the lower jaw, and one end of the upper jaw and a corresponding end of the lower jaw are moveably supported by the guide bolt. The upper jaw and lower jaw are supported at their respective opposite ends by the tightening screw. When the tightening screw is adjusted to cause the upper jaw and lower jaw to move toward one another, the bottom surface of the recess is brought into contact with the retaining ring. This action forces the wedge and restraining ring into frictional engagement, resulting in the wedge being firmly held against the downcomer. Thus, this frictional engagement causes the downcomer, wedge, and restraining ring to be secured in a desired position.

11 Claims, 2 Drawing Sheets

BWR JET PUMP WEDGE KEEPER

CROSS-REFERENCE

This application is a division of Ser. No. 09/172,620 filed Oct. 15, 1998 now abandoned which claims the benefit of U.S. Provisional Application No. 60/063,657 filed on Oct. 28, 1997.

FIELD OF THE INVENTION

The present invention relates generally to a device for maintaining a jet pump downcomer in contact with a restraining ring. More particularly, the invention relates to a locking device that will hold a wedge in tight engagement with the restraining ring, thus maintaining a frictional engagement between the restraining ring and the downcomer.

BACKGROUND OF THE INVENTION

A conventional downcomer may be used in distillation, absorption, extraction and other fluid contacting operations along with a fluid-contacting device. As illustrated in U.S. Pat. No. 3,784,175, a downcomer aids in the mixing or separation of fluids. A downcomer typically comprises a vertically extending structure similar to pipes or ducts.

When used in a boiling water reactor (BWR), the downcomer is associated with a fluid-contacting device. The downcomer typically connects an upper portion of the fluid-contacting device with a lower portion. The downcomer, thus, serves as a passageway for descending fluids. Often, fluid mixing occurs in the downcomer. For example, hot reactor fluids may be mixed with cool feedwater. Consequently, it is important to maintain proper vertical alignment between the downcomer and the upper and lower portions of the fluid-contacting device and any other components associated with the downcomer.

In conventional BWR systems, existing jet pump downcomers are generally held in place by only a restraining ring. The downcomer is typically located in the restraining ring by two adjustable screws and a wedge. Often the screws are tack welded in place. The wedge rides on a guide bolt, and is held in place mainly by gravity. The described arrangement can loosen under vibration, causing long and expensive fieldwork to eliminate gaps between the downcomer and the wedge and to readjust the screws.

SUMMARY OF THE INVENTION

It is an object of the present invention to provide a jet pump downcomer locking device that uses frictional forces to hold the downcomer in place.

It is a further object of this invention to provide a jet pump downcomer locking device that is easy to install and service.

The foregoing objects and other objects of the invention are obtained by providing a locking device including an upper jaw, a lower jaw, a connecting member movably supporting the upper jaw and the lower jaw, and a means for inducing a compressive force against the upper jaw and the lower jaw.

The means for inducing a pressure against the upper jaw and the lower jaw is a tightening screw extending therebetween. The tightening screw, when tightened, induces a compressive force on both the upper jaw and the lower jaw. One end of the upper jaw and a corresponding end of the lower jaw are moveably supported by a guide bolt.

The guide bolt is supported on the exterior surface of the downcomer by two guide blocks carried by and extending from the exterior surface of the downcomer.

The tightening screw and the guide bolt each support the upper jaw and lower jaw such that the upper jaw and the lower jaw may be moved toward or away from one another.

The locking device described herein may be used in a nuclear reactor to restrain a jet pump downcomer in a desired position. When so used, the assembly includes a restraining ring; a downcomer carried the restraining ring; a wedge supported by the restraining ring and the downcomer; a guide bolt extending in an axial direction in relation to the downcomer such that the wedge is movably supported by the guide bolt; a locking device including an upper jaw; a lower jaw placed in an opposing position below the upper jaw; and a tightening screw movably supporting the upper jaw and the lower jaw.

The wedge is interposed between the upper jaw and the lower jaw, and one end of the upper jaw and a corresponding end of the lower jaw are moveably supported by the guide bolt. Both the upper jaw and the lower jaw, respectively, include a hook-shaped member at the distal end thereof.

The tightening screw is retained within a housing that defines a recess. When the tightening screw is adjusted to cause the upper jaw and lower jaw to move toward one another, the bottom surface of the recess is brought into contact with the restraining ring. This action forces the wedge and restraining ring into frictional engagement, resulting in the wedge being firmly held against the downcomer. Thus, this frictional engagement causes the downcomer, wedge, and restraining ring to be secured in a desired position.

BRIEF DESCRIPTION OF THE DRAWINGS

The features and inventive aspects of the present invention will become more apparent upon reading the following detailed description, claims and drawings, of which the following is a brief description:

DESCRIPTION OF THE PREFERRED EMBODIMENT

Figure 1:
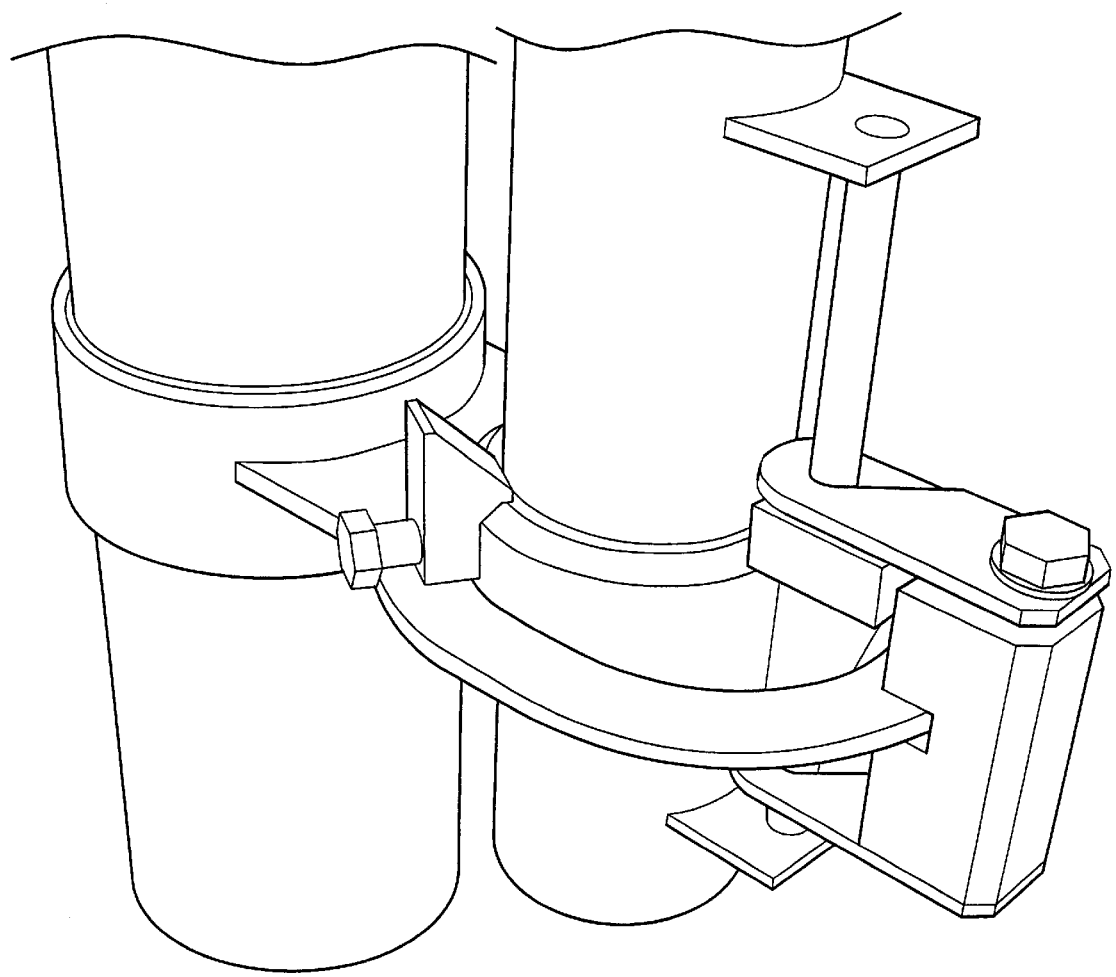
FIG. 1 is a perspective view showing a locking device formed in accordance with the teachings of the present invention.

A locking device 10 according to the present invention is shown in FIG. 1. In one embodiment, the locking device 10 assists a restraining ring 34 and a wedge 18 in supporting a jet pump downcomer 11 in a desired position.

Typically, the restraining ring 34 supports the downcomer 11. In the embodiment shown, the downcomer 11 is located inside the restraining ring 34 at the ring's inner peripheral surface 33, FIG. 1. Two adjustable screws 36 and the wedge 18 position the downcomer 11 within the restraining ring 34. The adjustable screws 36 extend through the restraining ring 34, and each screw is located on an opposing side of the restraining ring 34.

The wedge 18 is located between the restraining ring 34 and the downcomer 11, and is largely held in place by gravity. The wedge 18 includes a vertically extending surface 32 that contacts the downcomer 11. The wedge 18 is carried by a guide bolt 20. Two guide blocks 22, 24 carried by the exterior surface of the downcomer 11 support the guide bolt 20 in an axial direction relative to the downcomer 11. In the preferred embodiment, each guide block 22, 24 is welded to the downcomer 11.

The locking device 10 is fabricated of stainless steel, and includes an upper jaw 12, a lower jaw 14, and a tightening screw 16. The locking device 10 is lightweight, and may be easily installed and maintained by those of ordinary skill in the art.

When installed on the downcomer 11, the upper jaw 12 and the lower jaw 14 are vertically disposed such that the upper jaw 12 rests against the top surface 31 of the wedge 18 and the lower jaw 14 is located below the wedge 18. The upper jaw 12 and the lower jaw 14 are rectangularly-shaped members. Both the upper jaw 12 and the lower jaw 14 include a distal end 28, 30, respectively, and a proximate end 25, 15, respectively. The distal ends 28, 30 are each moveably supported by the guide bolt 20. In one embodiment, the distal ends 28, 30, respectively, define a hook 26(a), 26(b). Each hook 26(a), 26(b) is movably positioned around the guide bolt 20.

Figure 2:
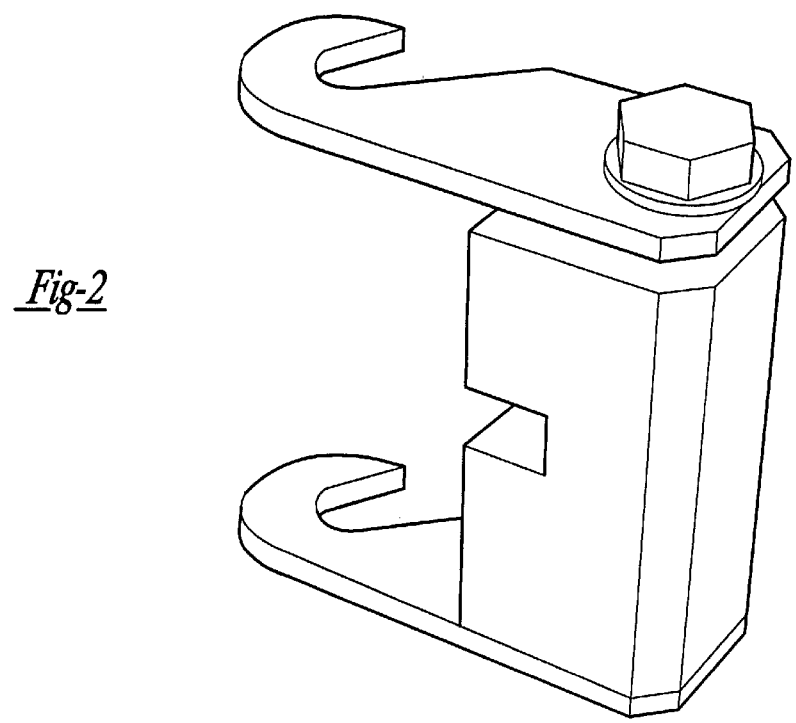
FIG. 2 is a perspective view showing the locking device shown in FIG. 1 installed on a jet pump downcomer.
Figure 3:
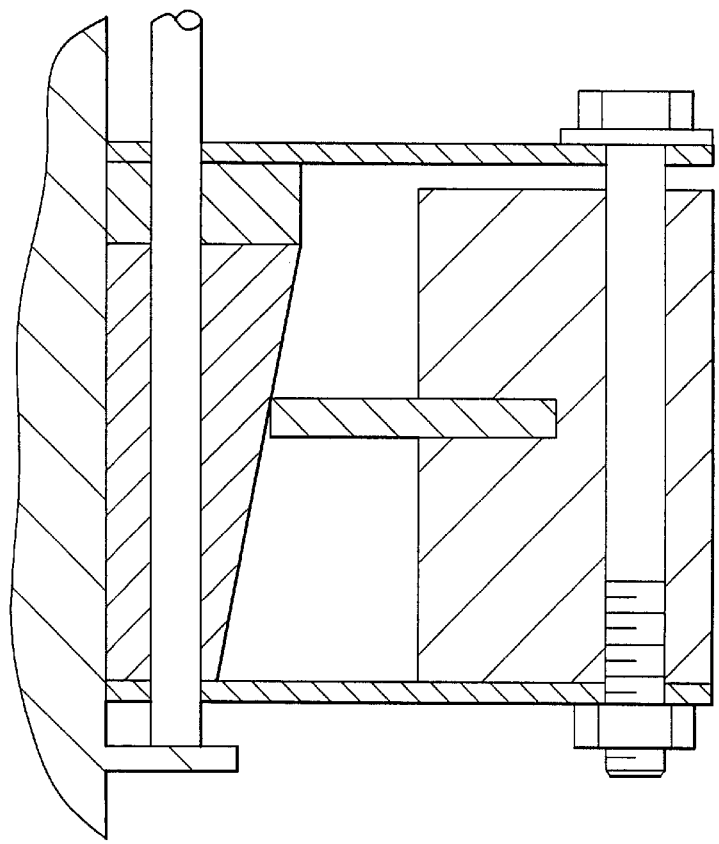
FIG. 3 is a cross-sectional view of the locking device shown in FIG. 1.

As shown in FIGS. 1, 2 and 3, the tightening screw 16 extends between the upper jaw 12 and the lower jaw 14. Specifically, the tightening screw 16 supports the proximate ends 15 and 25, respectively, of the upper jaw 12 and the lower jaw 14. As illustrated in FIGS. 1 and 2, a housing 38 retains the tightening screw 16. The housing 38 defines a recess 40 that receives the restraining ring 34.

As the tightening screw 16 is tightened, the upper jaw 12 and the lower jaw 14 move toward one another. When the tightening screw 16, is turned in the opposite direction, the upper jaw 12 moves away from the lower jaw 14. The tightening screw 16 is actuated remotely using techniques known in the field, as the locking device is located inside a nuclear reactor.

The tightening screw 16, once the desired torque has been applied, is prevented from turning by a reusable locking crimp (not shown) carried by the tightening screw 16. The locking crimp is of the type commonly known and used by those of ordinary skill in the art. The locking action of the crimp may be easily overcome if readjustment is required at a later time in the field.

It will be appreciated that a force inducing member such as a spring loaded member may replace the tightening screw 16. One spring loaded member may be placed on both the upper jaw 12 and another on the lower jaw 14 such that compressive forces are generated at each of the upper jaw 12 and the lower jaw 14. As discussed below, the squeezing action of the compressive forces firmly holds the restraining ring 34 against the wedge 18, thus retaining the downcomer 11 in the desired position.

OPERATION

In order to secure the downcomer in position, the wedge 18 and restraining ring 34 are subjected to compressive forces induced on the upper jaw 12 and the lower jaw 14 by tightening the tightening screw 16. As the tightening screw 16 is turned to move the upper jaw 12 and the lower jaw 14 toward one another, the upper jaw 12 induces a downward force on the top surface 31 of the wedge 18. In turn, the compressive force on the lower jaw 14 induces an upward force on the bottom surface of the restraining ring 34. The compressive forces generated against the top of the wedge 18 and the bottom of the restraining ring 34 firmly hold the wedge 18 and restraining ring 34 in contact, forcing the wedge 18 against the downcomer 11 so as to lock the downcomer 11 in a desired position.

In the embodiment shown, the compressive force on the lower jaw 14 creates an upward force on the bottom surface of the wedge 18, causing the wedge to move slightly upward. As the wedge 18 moves upward, the bottom surface 42 of the recess 40 contacts the restraining ring 34, forcing the restraining ring 34 against the wedge 18. Simultaneously, the tightening screw 16 causes a downward force on the upper jaw 12 that is transferred to the surface 31 of the wedge 18. Consequently, the wedge 18 moves slightly downward against the restraining ring 34. As a result, the upward motion of the restraining ring 34 is impeded by the downward motion of the wedge 18, resulting in the wedge 18 being pressed tight against the restraining ring 34. This arrangement creates a clamping action that frictionally engages the restraining ring 34, the wedge 18 and the downcomer 11, resulting in the downcomer 11 being secured in the desired position.

There are a variety of configurations that may be employed to fabricate apparatus 10. Thus, the disclosed embodiment is given to illustrate the invention. However, it is not intended to limit the scope and spirit of the invention. Therefore, the invention should be limited only by the appended claims.

We claim:

1. A locking device/for use in a nuclear reactor to restrain a jet pump downcomer comprising:
    a restraining ring;
    a downcomer carried by the restraining ring;
    a wedge supported by the restraining ring and the downcomer;
    a guide bolt extending in an axial direction in relation to the
    downcomer such that the wedge is movably supported by the guide bolt;
    a locking device comprising:
        an upper jaw;
        a lower jaw placed in an opposing position below the upper jaw; and
        a tightening screw movably supporting the upper jaw and the lower jaw.

2. The locking device as defined in claim 1, wherein the wedge is interposed between the upper jaw and the lower jaw.

3. A locking device as defined in claim 1, wherein the guide bolt is carried by two guide blocks supported by the downcomer.

4. The locking device as defined in claim 1, wherein the guide blocks are welded to the downcomer.

5. The locking device as defined in claim 1, wherein one end of the upper jaw and a corresponding end of the lower jaw are moveably supported by the guide bolt.

6. The locking device as defined in claim 5, wherein the upper jaw includes a hook-shaped member at the distal end thereof.

7. The locking device as defined in claim 5, wherein the lower jaw includes a hook-shaped member at the distal end thereof.

8. The locking device as defined in claim 1, wherein the tightening screw is retained within a housing.

9. The locking device as defined in claim 8, wherein the housing defines a recess such that the lower surface of the recess is brought into contact with the restraining ring.

10. The locking device as defined in claim 1, wherein the locking device is fabricated of stainless steel.

11. A locking device for use in a nuclear reactor to restrain a jet pump downcomer comprising:
    a restraining ring;
    a downcomer carried by the restraining ring;
    a wedge supported by the restraining ring and the downcomer;
    a guide bolt extending in an axial direction in relation to the downcomer such that the wedge is movably supported by the guide bolt; and a locking device comprising:
an upper jaw;
a lower jaw placed in an opposing position below the upper jaw; and means for inducing a compressive force against the upper jaw and lower jaw, wherein the means for inducing a compressive force against the upper jaw and the lower jaw is a tightening screw extending between the upper jaw and the lower jaw.

* * * * *